United States Patent
Müller

[11] Patent Number: 5,127,877
[45] Date of Patent: Jul. 7, 1992

[54] VENTILATION SYSTEM FOR A MOTOR VEHICLE

[75] Inventor: Otto Müller, Sesslach, Fed. Rep. of Germany

[73] Assignee: Siemens Aktiengesellschaft, Berlin & Munich, Fed. Rep. of Germany

[21] Appl. No.: 589,339

[22] Filed: Sep. 27, 1990

[30] Foreign Application Priority Data

Sep. 27, 1989 [EP] European Pat. Off. ........ 89117899.8

[51] Int. Cl.⁵ .......................... B60S 1/54; B60H 1/00
[52] U.S. Cl. ...................................... 454/126; 454/75
[58] Field of Search ............ 98/2, 2.11, 2.05, 2.06; 62/161; 236/49.3

[56] References Cited

U.S. PATENT DOCUMENTS

| | | | |
|---|---|---|---|
| 4,420,115 | 12/1983 | Matsushima et al. | 98/2.05 |
| 4,460,035 | 7/1984 | Mizote et al. | 62/161 |
| 4,664,023 | 5/1987 | Miyadera et al. | 98/2 |

FOREIGN PATENT DOCUMENTS

| | | | |
|---|---|---|---|
| 0272789 | 6/1988 | European Pat. Off. | |
| 3007407 | 9/1981 | Fed. Rep. of Germany | 98/2.06 |
| 0026618 | 2/1983 | Japan | 236/49.3 |
| 0134317 | 6/1987 | Japan | 98/2 |
| 0194927 | 8/1987 | Japan | 98/2 |

Primary Examiner—Albert J. Makay
Assistant Examiner—William C. Doerrler
Attorney, Agent, or Firm—Kenyon & Kenyon

[57] ABSTRACT

An override function for an automatic temperature and/or air flow controller is achieved with an individual, at least partial closing of outlet nozzles of a ventilation system independent of the controller the outlet nozzles are in the middle plane in the inside of the motor vehicle and controlled by way of a regulating device. The regulating device is additionally set as a function of a condition of an adjustable control mechanism device which is assigned to each of the outlet nozzles for the manual, at least partial, blocking of the outlet nozzles. A rotary control knob is respectively integrated into each of the outlet nozzle housings as the adjustable control mechanism, and has an assigned set potentiometer with a variable setting range including a first setpoint for automatic operation control and an override control range with a variable setpoint for the correspondingly variable blocking condition of the outlet nozzles.

7 Claims, 1 Drawing Sheet

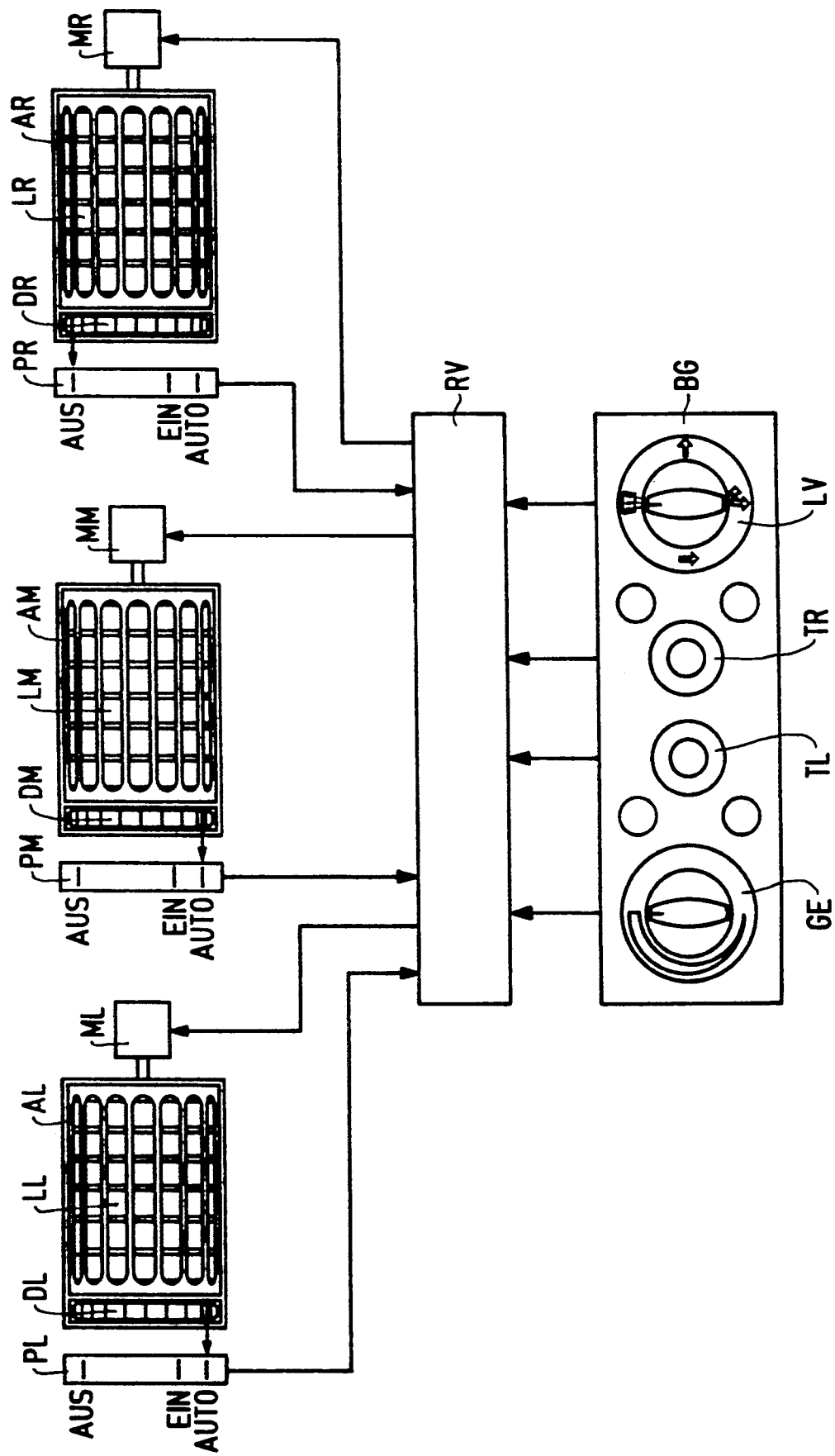

VENTILATION SYSTEM FOR A MOTOR VEHICLE

BACKGROUND OF THE INVENTION

The present invention relates to a ventilation system for a motor vehicle and more particularly to a mechanism for manual override of an automatically regulated ventilation system.

German Patent Application DE-A1-37 30 466 discloses a ventilation system for a motor vehicle that includes a regulating device to automatically regulate the distribution of temperature or air of an air stream through a plurality of outlet nozzles disposed in a dashboard or middle plane region of the vehicle.

The outlet nozzles in the middle plane (dashboard) of the vehicle serve above all the purpose of directly blowing cool air onto the vehicle occupants during a cooling operation. The blower speed, the air-distribution flaps, possibly the fresh air/circulated air flaps as well as the compressor and a water valve in a heat exchanger are automatically set by the regulating device, which is preferably electronic, in a closed control loop. The operational parameters are set according to a preselected program as a function of, on the one hand, a temperature setpoint which is able to be specified on a control unit in the dashboard and by various sensors, in particular by temperature sensors for the outside air, for the air exhaust in the main air chamber of the air conditioner on the output side, for the air inside the vehicle compartment, for the heat exchanger and the defogger as well as possibly by a sensor to detect the intensity of the actual values given off by received sunbeams. The adjustment of air-shut-off flaps, which are mounted in the air outlet nozzles of the middle plane, is thereby solely subject to the fully automatic regulation of the ventilation system. The direct flow of cold air from the outlet nozzles of the middle plane is generally considered pleasant by many vehicle occupants when outside temperatures, i.e., temperatures outside of the motor vehicle are high. However, the passenger may be subjected to uncomfortable drafts in the case of a fully automatic air conditioning system. This can occur due to the continued blowing of very cold air.

SUMMARY OF THE INVENTION

The present invention achieves ventilation comfort in an automatically controlled air condition system using controlled flaps in outlet nozzles in the middle plane to hinder a potentially uncomfortable flow of air which is felt as a draft. Moreover, the present invention achieves this by providing a manually adjustable mechanism providing an input to a controller which controls the air flow and temperature distribution, the operation of the mechanism providing selectable blocking of the outlet nozzles. By means of these measures, a function overriding the automatic operation of the air conditioning system can be made possible on an individual basis in the individual shut-off flaps for each nozzle with little additional structural complexity and while simultaneously using the regulating device.

According to an embodiment of the present invention, a rotary control knob is laterally integrated in each outlet nozzle housing in a particularly structurally simple and simultaneously design-enhancing manner, to provide the possibility of manual intervention in the automatic regulation to at least partially block various individual outlet nozzles. The rotary control knob controls a setting contact of a set-potentiometer that has a setting range including a first constant setpoint for strict automatic operation control, and an override control range that includes a variety of setpoints to correspondingly block the outlet nozzle in a variable manner.

In order to prevent unfavorable operating conditions of the air conditioning system, a fully manual blocking of all outlet nozzles while a cooling operation is provided under automatic regulation, a minimum aperture setting for a minimum amount of airflow through the outlet nozzles in the override operation is provided which is monitored in an advantageous manner by the regulating device or controller.

BRIEF DESCRIPTION OF THE DRAWING

The present invention is more closely explained in the following in light of a schematic exemplified embodiment which is represented in the drawing.

DETAILED DESCRIPTION

A left outlet nozzle AL, a right outlet nozzle AR and a center outlet nozzle AM are mounted in distribution above the dashboard of a motor vehicle not shown in detail. The air flowing in from the back of each of the outlet nozzles approaches the front through a respective lower insert including vertically pivotal louvered inserts LL, LR and LM, through stationary horizontal directional louvers behind this, and through horizontally-pivotal vertical directional louvers behind the stationary horizontal directional louvers. By means of the respective pivoting of the horizontal and vertical-pivotal louvers, the exiting air stream can be directed at the vehicle occupants in various specific flow directions.

A shut-off flap, not illustrated in the drawing which is mounted respectively behind each of the louver inserts, is actuated by a electromotor ML or MR or MM provided in association with each louver insert. The electromotors' operations are dependent on the setting of a control unit BG, which has an integrated electronic regulating device RV. On its front, the control unit BG includes a selector for setting the amount of air by dialing a change in the blower GE; a selector for setting the air distribution LV, of setting temperature on the left TL and the temperature on the right TR.

In the case that the airstream flowing out of one or more outlet nozzles due to the automatic regulation is considered uncomfortable, according to the present invention, an individual manual adjustment of the shut-off flaps can be achieved in an override of the automatic regulators with the aid of the regulating device RV and the motors ML, MR and MM which are assigned to the shut-off flaps by operating a respective rotary control knob DL or DR or DM which is laterally integrated in the housing of the respective outlet nozzles.

The manual operation of one of the rotary control knobs DL or DR or DM is associated with a respective set-potentiometer PL or PR or PM which is actuated by these respective rotary control knobs such that, starting from a stop location designated as "Auto" and representing fully automatic regulation, first the automatic regulation is switched off by turning the respective rotary control knob to the setting "On" of the respective set-potentiometer, at which point a continuous adjustment range is reached for the respective shut-off flap. By continuing to turn the respective rotary control knob, the shut-off flap can then be gradually closed further until reaching the setting "off" of the set potentiometer.

Through monitoring the set-potentiometers with the regulating device RV, however, it is ensured in an advantageous manner according to a development of the invention, that an override operation cannot fully close all of the shut-off flaps at the same time due to override operation.

In the present exemplified embodiment it was assumed that only one of the three nozzles was placed in an override mode leaving two outlet nozzles in the automatic mode. However, another outlet nozzle or both other outlet nozzles may be blocked off as much as possible in the override position as well.

Furthermore, for each rotary control knob there is, in addition to the stop location indicating automatic operation, a rotary-slide setting range for an override control range.

Also, even in the override mode of operation, the shut-off flap is maintained with a minimum operative setting that is monitored by the regulating device or controller RV.

It should be apparent that with only a little additional structural complexity, and despite the presence of full automation, the shut-off flaps can be individually adjusted using simple and small means according to the individual comfort needs of the vehicle occupants by way of the respective rotary control knob DL or DR or DM and the successive set potentiometer PL or PR or PM in a simple manner while simultaneously using the present regulating device RV and the servo-motors ML or MR or MM.

What is claimed is:

1. A ventilation system for a motor vehicle, including a plurality of outlet nozzles disposed in a dashboard of a motor vehicle, the temperature and air distribution of the air from the outlet nozzles being controlled by a main controller, the system comprising:
   a controller associated with each outlet nozzle; and
   a manual adjustment mechanism, providing an input to said controller, to override the main controller and regulate a distribution of temperature or air of the airstreams being issued from the outlet nozzles by selectably blocking the outlet nozzles.

2. The ventilation system according to claim 1, further comprising a plurality of rotary control knobs which are integrated into the housing of the outlet nozzles, each rotary control knob controlling one of the outlet nozzles.

3. The ventilation system according to claim 2 wherein each rotary control knob includes a stop location corresponding to fully automatic operation control and a rotary-slide setting range for said override control range.

4. The ventilation system of claim 1 further comprising a plurality of shut-off flaps, one such flap provided for each outlet nozzle, each shut-off flap having a minimum aperture setting during an override of the automatic operation.

5. The ventilation system of claim 1 further comprising a plurality of shut-off flaps, one such flap provided for each outlet nozzle, each shut-off flap having a minimum aperture setting during an override of the automatic operation.

6. The ventilation system of claim 2 further comprising a plurality of shut-off flaps, one such flap provided for each outlet nozzle, each shut-off flap having a minimum aperture setting during an override of the automatic operation,.

7. The ventilation system according to claim 4, wherein said minimum aperture setting during the override operation is monitored by said controller.

* * * * *